United States Patent [19]

Gryczka

[11] 3,963,835

[45] June 15, 1976

[54] FERMENTED FLOUR AND METHOD OF PREPARATION

[75] Inventor: Alfred J. Gryczka, Sarasota, Fla.

[73] Assignee: Microlife Technics, Inc., Sarasota, Fla.

[22] Filed: Apr. 24, 1975

[21] Appl. No.: 571,232

Related U.S. Application Data

[63] Continuation of Ser. No. 438,749, Feb. 1, 1974, abandoned.

[52] U.S. Cl. .................................. 426/18; 426/622
[51] Int. Cl.² ...................... A23L 1/10; A21D 2/08; A23L 1/23
[58] Field of Search ...................... 426/18, 62, 622

[56] References Cited
UNITED STATES PATENTS

| | | | |
|---|---|---|---|
| 1,910,967 | 5/1933 | Ruckdeschel | 426/18 |
| 2,023,500 | 12/1935 | Wogerbauer | 426/18 |
| 2,060,264 | 11/1936 | Swift | 426/18 |
| 2,322,940 | 6/1943 | Kirby et al. | 426/18 |
| 2,476,242 | 7/1949 | Ginsburg | 426/18 |
| 3,615,697 | 10/1971 | Hollenbeck | 426/18 |

*Primary Examiner*—James R. Hoffman
*Attorney, Agent, or Firm*—Miller, Morriss, Pappas & McLeod

[57] ABSTRACT

A method is described for making fermented or "sour" flour having distinctive flavor and acidic properties when incorporated into baked products. Flour and substantial amounts of water are mixed together and fermented with a non-toxic Lactobacillus bacterium and then dried to less than about fourteen (14%) percent by weight water so as to provide a finely divided flour. The use of *Lactobacillus plantarum* is particularly disclosed.

5 Claims, No Drawings

FERMENTED FLOUR AND METHOD OF PREPARATION

This is a continuation of application Ser. No. 438,749, filed Feb. 1, 1974, and now abandoned.

BACKGROUND OF THE INVENTION

1. Field of the Invention

This invention relates to a method for making fermented or "sour" flour. In particular non-toxic *Lactobacillus* bacteria are used for the fermentation of a flour and water mixture which is then dried so as to provide the finely divided fermented flour.

2. Description of the Prior Art

Fermented or sour dough bread and other sour dough baked goods, such as sour dough biscuits, pancakes, rolls and crackers, are commonly made by mixing a large quantity of sour starter dough (sometimes called starter or mother sponge and containing yeasts and bacteria which convert maltose and glucose in the flour to lactic acid, acetic acid and carbon dioxide) with water in small amounts, flour and salt and holding the resulting dough mixture in a warm place to allow fermentation to proceed. Part of this sour dough is then saved for use as a starter for the next batch of dough to be made, with flour and water being added to the starter dough in increasing quantities every 6 to 8 hours until the quantity of dough needed for the next production batch is attained. The remainder of the sour dough is proofed and baked in a well known manner to obtain the sour dough baked products. This method is laborious and time consuming and is done commercially only because of the great and high price of sour dough products. Such sour dough baked products are not constant in acidity and flavor from batch to batch over a period of time particularly because of varying bacterial amounts as well as compositions due to contamination.

As a result of a recent improvement developed by the present inventor, the prior art is using a *Lactobacillus plantarum* concentrate to prepare baked products. This concentrate is sold to a bakery in frozen form to allow for shipping from the manufacturer. The bakery then thaws the concentrate and prepares a dough sponge with baking ingredients and then bakes the products. This method is not well suited to large commercial bakeries. Also, the use of frozen bacterial concentrates is foreign to the home user who is accustomed to using flour alone.

OBJECTS

It is therefore an object of the present invention to provide a fermented or sour flour that can be used for baking directly to produce sour dough products without any bacterial fermentation by the user. It is further an object of the present invention to provide a method for producing the fermented flour which is easy to perform and economic and produces uniform results from batch to batch. These and other objects will become increasingly apparent to those skilled in the art.

SUMMARY OF INVENTION

The method of the present invention for preparing a fermented flour comprises fermenting a mixture of water and flour, the weight ratio of flour to water being at least about 2:3, with a non-toxic *Lactobacillus* which forms lactic acid and acetic acid in the fermentate from sugars (such as, maltose, sucrose and glucose) in the flour fermentation mixture; and drying the fermented mixture to a moisture content of less than about fourteen (14%) percent by weight of the mixture so as to produce a finely divided flour.

The fermented flour of the present invention comprises in admixture, a finely divided fermented flour, lactic and acetic acids resulting from fermenting the flour fermentation mixture with a non-toxic *Lactobacillus*, and water in an amount between about one and fourteen percent by weight of the fermented flour, wherein the fermented flour has a pH between about 3.2 and 4.1.

The *Lactobacillus* bacteria are used to ferment flour in order to develop desirable flavor and acidity characteristics. The fermented flour can be used as all or part of the total flour of a baked good formulation and it will impart to the baked products the desirable flavor and acidity characteristics of sour dough.

The genus *Lactobacillus* particularly includes the bacteria

*Lactobacillus sanfrancisco*
*L. caucasicus*
*L. lactis*
*L. helveticus*
*L. acidophilus*
*L. delbrueckii*
*L. bifidus*
*L. casei*
*L. thermophilus*
*L. buchneri*
*L. fermenti*
*L. brevis*
*L. leichmannii*
*L. bulgaricus* which can be used in the present invention. These organisms ferment maltose, sucrose and/or glucose in the flour fermentation mixture to form mostly lactic acid and some acetic acid. The fermented flour of the present invention is preferably prepared using *Lactobacillus plantarum* (B-5632) which is described as follows:

General Description — Gram-positive, non-motile, rods, ordinarily 0.6–0.8 um by 1.2–1.6 um, occurring singly or in short chains.

Catalase — negative glucose fermented to lactic acid (homofermentative) Guanine plus cytosein (G + C) content of DNA is 43.6% (using DNA-RNA hybridization technique), [$J_m$ = 87.25]

| Biochemical Test or Fermentation | Reaction |
| --- | --- |
| Glucose | 3+ |
| Maltose | 3+ |
| Galactose | 3+ |
| Fructose | 3+ |
| B-D + cellobiose | 3+ |
| Sucrose | 3+ |
| a-D + millibiose | 3+ |
| Trehalose | 3+ |
| Lactose | 3+ |
| Sorbitol | 1+ |
| Mannitol | 1+ |
| Glycerol | ± |
| Dextrin | ± |
| Starch | ± |
| Amygdalin | − |
| Inulin | ± |
| Salicin | − |
| Mannose | − |
| Dulcitol | − |
| Arabinose | − |
| Raffinose | − |
| Xylose | − |
| Myo-inositol | − |
| Sorbose | − |

-continued

| Biochemical Test or Fermentation | Reaction |
| --- | --- |
| a-methyl-1-D-glucoside | − |
| Acetate | − |
| Citrate | − |
| Lactate | − |
| Ethanol | − |
| Blood Agar | growth, no hemolysis |
| Litmus milk | acid coagulation, reduced |
| Arginine hydrolysis | − |
| Esculin hydrolysis | + |
| Gelatin hydrolysis | − |
| Starch hydrolysis | − |
| Type of lactic acid produced | DL |

The bacteria are cultured and preferably are concentrated. The fermentation will produce between about $1 \times 10^8$ to $5 \times 10^9$ cells per ml of growth medium.

The preferred procedure for obtaining a bacterial concentrate is as follows: The bacteria such as *Lactobacillus plantarum* are cultured in a growth medium formulated by dissolving in tap water the following ingredients at the weight concentration indicated: dextrose, 1 percent; yeast extract, 0.25 percent; cornsteep water, 0.50 percent. The medium is heated to 248°F for sterilization and held at that temperature for 15 minutes and then cooled to 90°F. The medium is adjusted to pH 6.0 with ammonia. The medium is inoculated with a mother culture of bacteria. The culture is incubated at 90°F and continually maintained at pH 5.0 by addition of ammonia. The bacteria are then concentrated by centrifugation.

It is important that each *Lactobacillus* species to be used be grown separately in order to obtain the concentrations of pure bacteria necessary for fermentation.

The bacteria then can be concentrated by centrifugation. The concentrate can contain from about $1 \times 10^9$ to $1 \times 10^{11}$ bacterial cells per milliliter. Cell pastes containing up to $1 \times 10^{15}$ cells per gram can be prepared. A suitable stabilizing agent, such as glycerol which is approved for food use is added when the mixed culture concentrate is to be frozen for storage before use. If the bacterial cell count is less than the minimum amount specified above, maximum acid development will require a longer time, that is, more than 24 hours.

The centrifuging of bacteria to produce concentrates is well known to those skilled in the art and is preferably carried out so that some of the spent culture media is retained with the cells. Alternatively, if the cells are centrifuged to a greater degree of dryness, then fresh growth medium containing some more fluid can be added to the concentrates. The growth medium insures the viability of the bacteria and creates favorable conditions for growth of the bacteria during fermentation of the flour.

The bacteria can be frozen and stored prior to use in a mixture containing between about two to twenty percent by weight glycerol at a suitable temperature, preferably about −20°F (−28.8°C), to maintain optimum activity and viability.

The bacteria are used to ferment flour (directly or by thawing the frozen concentrate) by mixing the bacteria with flour and water followed by maintaining the mixture for a period of time at a suitable temperature for fermentation. The ingredients of a formulation for making sour flour comprise flour, sucrose, salt, water and the bacteria. The flour can be spring wheat, rye, whole wheat, or soft or hard winter wheat. High gluten flours (containing about 14.5 to 15.5 percent by weight gluten and between about 40 to 50 percent by weight ash) are preferred for bread making; however, regular patent flours (lower gluten flours) can be used. Small amounts of salt can be incorporated in the mix preferably in the range of about 0.5 to 2.0 percent by weight, based on the weight of the mixture and depending on the particular product for which the flour is intended. Small amounts of sucrose or other sugars can be added to enhance the growth of the bacteria preferably in an amount up to about 4% by weight of the mixture. The ratio of flour to water is at least about 2 to 3 to about 4 to 1. It is necessary that the fermentation mixture be sufficiently fluid for spray drying.

The amount of the bacteria added to the flour is variable and preferably within the range of 0.05 percent to 0.15 percent by weight based on the amount of flour, depending on the fermenting time and temperature. Preferably between about $1 \times 10^9$ and $1 \times 10^{11}$ cells of *Lactobacillus* are used per pound of flour. For the typical conditions it will be acceptable to use about 0.1 percent by weight of a culture concentrate containing between 40 to $60 \times 10^9$ cells per milliliter based on the weight of flour for a fermentation time between 15 to 18 hours and fermentation temperature of 90°F (32.2°C). If longer fermentation times and/or higher temperatures are used, the amount of concentrate can be reduced, and shorter fermentation times or lower temperatures will require greater amounts of concentrate for adequate acid development. The fermentation temperature range for *Lactobacillus* is between about 70°F (21.1°C) and 113°F (45°C). The fermentation time is between about 12 to 48 hours at these temperatures.

After the fermentation is completed, flour is then dried so as to produce a finely divided flour preferably by spray drying at a temperature less than about 392°F (200°C) to prevent burning. This produces a moisture content of less than about fourteen (14%) percent by weight. The majority of the *Lactobacillus* bacteria are killed by the drying.

The fermented flour can then be used to make bakery products having distinctive flavor and acidic properties, by means of the "no time dough" process. This is an improvement over the sponge method in that it eliminates the necessity of user having to repeatedly ferment a sponge, thus saving the baker much time and labor.

The usual ingredients for making conventinal white bread, such as dough conditioners, mold inhibitors, and the like are not needed. Sugar and shortening are optional ingredients in making sour dough baked products. Yeasts (such as *Saccharomyces cerevisiae* or *S. exiguus*) are important ingredients in making the sour dough bread because they provide the leavening action and improve the flavor. Such yeasts are used in a conventional manner.

It is generally required that the fully developed sour flour have a pH in the range of about 3.2 to 4.1 and that the pH of the final sour dough formulation prepared therefrom be in the range of about 3.8 to 4.1 just prior to baking. The relative amounts of unfermented and fermented flours used to make the sour dough are selected to meet these requirements. Generally, from ten to ninety percent (10 to 90%) by weight of the total flour in the baked good formulation is fermented flour and the remainder is unfermented flour.

The following examples, Examples 1 and 2 illustrate typical ways in which the flour fermentation method of the invention is practiced and the resulting flour used. It will be understood that the invention is not limited to the subject matter of these examples.

EXAMPLE I

The preferred procedure for making the fermented, high gluten flour is described in this example. The fermentation medium contained the ingredients:

| Ingredient | Amount (% by weight) |
| --- | --- |
| High gluten flour | 64.0 |
| Cane sugar | 2.0 |
| NaCl | 0.6 |
| Water | 33.4 |

The fermentation medium was then inoculated with the bacterial concentrate of *Lactobacillus plantarum* containing 40 to 60 × 10$^9$ cells per milliliter at the rate of about 28.3 grams (1 ounce) of culture per 27 kilograms (60 pounds) of flour. The medium was incubated at 32.2°C (90°F) for 15 to 18 hours during which time the pH dropped to pH 3.2. The temperature was held between about 70°F (21.1°C) and 113°F (45°C). The fermented mixture had the consistency of thick pancake batter.

The fermentate was then dried at a temperature of less than about 392°F (200°C) by a conventional method such as spray drying or drum drying with milling. The flour air outlet temperature was about 212°F (100°C). The resultant dried, fermented, high gluten flour had a maximum moisture content of less than about fourteen (14%) percent.

The finely divided, dried, fermented, high gluten flour was a stable preparation having a uniform, concentrated flavor and consistent, concentrated acidity resulting from action of the bacteria during fermentation. The dried mixture was stored in clear plastic bags for many months without deterioration.

The fermented flour can be used to manufacture uniform sour dough bakery products such as sour dough bread, sour dough biscuits, pancakes, rolls, sour rye bread, sour dough English muffins, soda crackers and variants such as oyster crackers, cracker meal, etc. Thus, when the fermented flour is combined with unfermented flour and is baked, the flavor and acidity of the fermented flour is retained, so that the baked product has the flavor and acidity characteristics of sour dough products prepared by the sponge process. In general, the weight ratio of fermented flour to untreated flour in the dough formulation is in the range of 1:9 to 9:1 depending on the acidity and flavor desired.

EXAMPLE II

The following are two typical formulations for sour dough french bread made by the no dough time process. The formula is given for batch size of 33 pounds of dough.

| Ingredients | Formula A Amount | Formula B Amount |
| --- | --- | --- |
| High gluten fermented flour of Example I | 3.18 kg (7 lbs.) | 4.08 kg (9 lbs.) |
| High gluten flour (regular) (14.5%–15.5% Protein) | 6.35 kg (14 lbs.) | 5.44 kg (12 lbs.) |
| Salt | 160 gm (5 ½ oz.) | 160 gm (5 ½ oz.) |
| Shortening (optional) | 170 gms (6 oz.) | 170 gms (6 oz.) |
| Yeast | 170 gms (6 oz.) | 170 gms (6 oz.) |
| Water | 5.13 kg (11 lbs. 5 oz.) | 5.13 kg (11 lbs. 5 oz.) |

Formula A is used if a mildly tart sour dough bread is desired. Formula B is used if a more tart loaf is desired.

The baking procedures are known to the prior art and were generally as follows: (1) Sour flour, unfermented flour, salt, yeast and shortening, if used, were provided in an appropriate sized mixer. Water was added and the ingredients were mixed at low speeds until all the ingredients were incorporated together. Slight variations in the amount of high gluten flour may be required to obtain the proper consistency of the dough. (2) The ingredients were mixed at medium speed for 5 to 6 minutes. The properly mixed dough was firm and dry, having the consistency of putty, and should readily pull away from the mixer. The properly mixed dough also exhibited a maximum amount of stretch (elasticity) and a maximum resistance to pull. (3) The dough was rested for 30 minutes at room temperature and scaled off to the desired weight. An intermediate proof for 10 to 20 minutes was used if desired. The loaves where shaped and placed into rye baskets for baking in a conventional oven, or on a peel for baking on the hearth. (4) The loaves were proofed at 32.2°C (90°F) to 40.5°C (105°F) for 45 to 75 minutes at 75 to 88% relative humidity. The loaves usually doubled in volume. (5) To obtain the proper crust structures, the fully proofed loaves were slashed several times just before being placed in the oven. An egg white wash or water wash can be used if desired. (6) Finally the loaves were baked at 196°C (385°F) to 204°C (400°F) until fully baked. Steam (0.21 kg per sq. centimeter or 3 psi) was used during the first half of baking period. The average baking time was 35 to 40 minutes for 454 gm (1 lb) loaves.

Various baking yeasts in amounts between 0.015 and 0.050 parts per part flour must be added to the dough mixture to provide leavening action in the bread. Such yeasts include for instance *Saccharomyces exiguus* or *S. cerevisiae*.

Small amounts of various edible acids were added to the fermented flour prior to spray drying to augment the acidity and to modify the flavor. Such acids included phosphoric, fumaric and lactic acids. Such additions did not seem to produce an improved taste in the baked product.

Variations in the formulation of doughs for bread and other products are well known to those skilled in the art. The fermented flour of the present invention is used in the manner of a conventional flour and provides a method for the home baking of sour dough products which has not previously been possible.

I claim:

1. The method for fermenting sugars in flour to provide an acid flour which comprises:

a. fermenting at a temperature between about 21.1°C and 45°C for between about 12 to 24 hours a mixture of a flour selected from rye and wheat flours and water with a concentrate of a non-toxic *Lactobacillus* which has been cultured while maintaining the pH between about 5.0 and 6.0 to produce a concentration of at least about $1 \times 10^8$ cells per ml as a single species of *Lactobacillus* before being mixed in the flour and allowing the fermentation mixture pH to drop due to the formation of lactic acid and acetic acid from the sugars in the fermentation mixture; and b. drying the fermentation mixture in air at a temperature between about 45°C and less than about 200°C to a moisture content of less than about 14 percent by weight of the mixture so as to produce a finely divided flour.

2. The method of claim 1 wherein the fermentation mixture weight ratio of flour to water is between about 2:3 to 4:1 parts and the mixture is spray dried.

3. The method of claim 1 wherein the pH of the fermentation mixture is allowed to drop to between about 3.2 and 4.1.

4. The method of claim 1 wherein the concentrate contains between about $1 \times 10^9$ and $1 \times 10^{11}$ cells of *Lactobacillus*.

5. The acid flour product of the method of claim 1 with a pH between about 3.2 and 4.1.

* * * * *